Nov. 13, 1956  R. K. GALLOWAY  2,770,397
LIQUID MEASURING AND DISPENSING APPARATUS
Filed Oct. 5, 1953
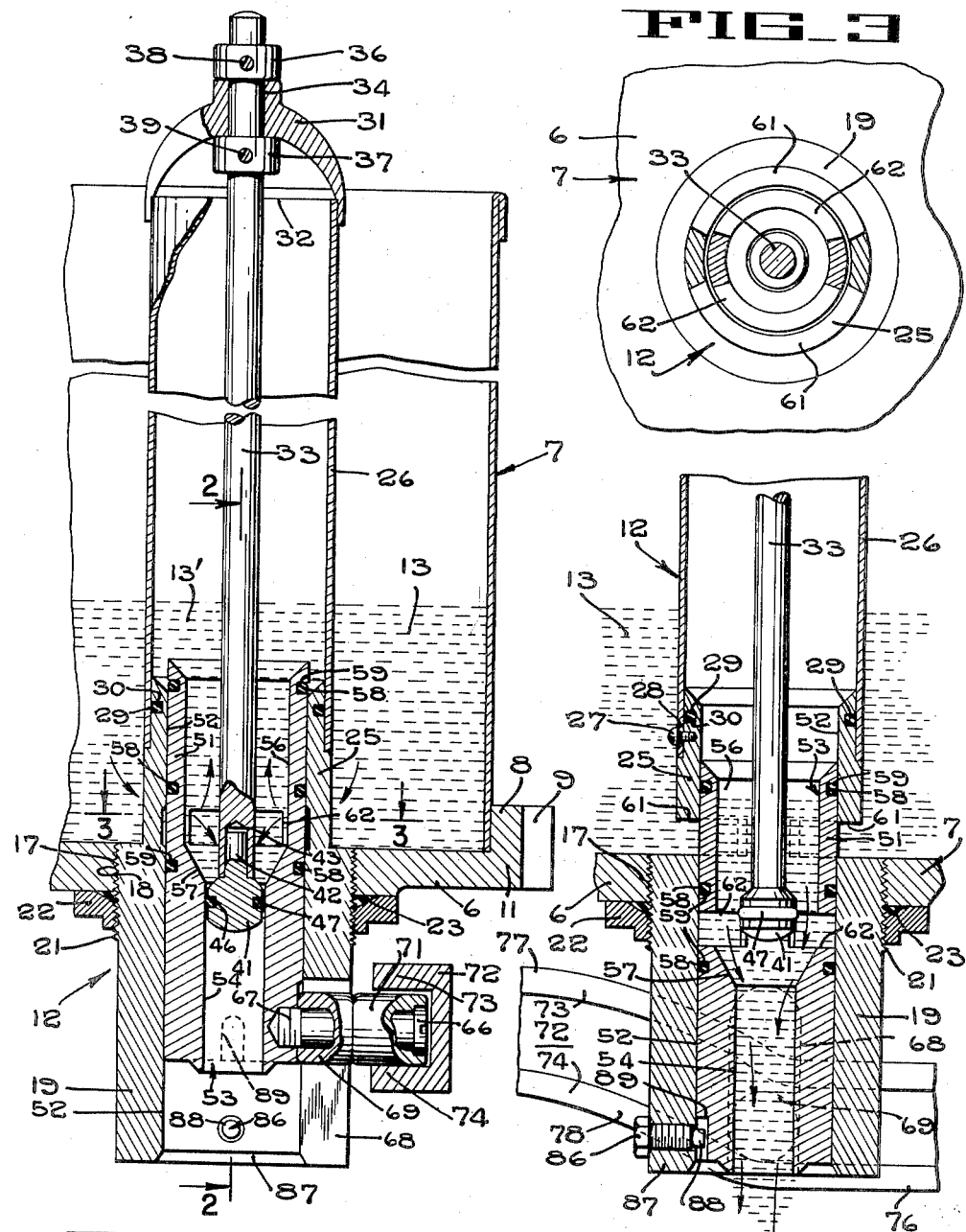
INVENTOR
ROBERT K. GALLOWAY
BY Hans G. Hoffmeister
ATTORNEY United States Patent Office 2,770,397
Patented Nov. 13, 1956

2,770,397

LIQUID MEASURING AND DISPENSING APPARATUS

Robert K. Galloway, Hoopeston, Ill., assignor to Food Machinery and Chemical Corporation, San Jose, Calif., a corporation of Delaware Application October 5, 1953, Serial No. 384,050

6 Claims. (Cl. 222—168.5)

This invention relates to liquid measuring and dispensing apparatus.

An object of the invention is to provide an improved liquid measuring and dispensing valve.

Another object is to provide liquid dispensing apparatus adapted for use as a filling valve in machines commonly employed in the food preservation industry to deliver measured quantities of brine or syrup into every one of an endless procession of cans.

Another object is to provide a liquid measuring and dispensing valve having improved and simplified means for controlling flow of liquid to and from the device.

Another object is to provide apparatus for measuring liquid and storing the measured quantity thereof until the proper time in the cyclical operation of a can filling machine, and operable at that time to deliver the stored quantity of liquid.

Another object is to provide a liquid measuring and dispensing apparatus of simple and rugged design, which is made up of a minimum number of parts, and which is fully dependable in its operation of dispensing the precise, desired quantity of fluid each time it is actuated.

Another object of the invention is to provide a liquid dispensing valve capable of discharging fluid rapidly and with so little turbulence as to minimize splashing and foaming.

Another object is to provide a liquid measuring and dispensing valve which can quickly and easily be dismounted, cleaned and sterilized, and thereafter remounted in operative condition.

These and other objects of the invention will become apparent from the following description and the accompanying drawings, in which:

Figure 1 is a vertical section of a liquid measuring and dispensing valve incorporating the principles of the present invention.

Figure 2 is a vertical section taken on the line 2—2 of Fig. 1 but showing a part of the valve in a different position.

Figure 3 is a horizontal section taken on the line 3—3 of Fig. 1.

The liquid measuring and dispensing device of the invention is illustrated in the drawing operatively mounted in the bottom 6 of the tank 7 of a rotary can filling machine such as that forming the subject matter of application Ser. No. 197,097, filed by Charles E. Kerr on November 22, 1950. Reference may be had to the said Kerr application for a complete disclosure of the type and manner of operation of can filling machines for which the measuring and dispensing valve of the present invention is particularly adapted. However, the apparatus of the present invention is not necessarily limited to use in connection with can filling machines of this type only.

As far as the details of the can filling machine are concerned, it will suffice for the purposes of the present disclosure to explain that the tank 7 is circular in plan and is mounted for rotation about a vertical axis at the center of the tank, and that the means for rotating the tank 7 includes a gear 8, the teeth 9 of which are provided on a peripheral flange 11 of the tank bottom 6. An endless series of liquid measuring and dispensing valves 12 of the present invention are arranged in a circular pattern, also concentric with the axis of the tank 7 in position with each of the several valves 12 extending through the bottom 6 of the tank 7.

A continuous procession of cans or other receptacles (not shown) to be supplied with measured quantities of the liquid 13 within the tank 7 are progressed by a suitable conveyor (not shown) in an arcuate path concentric with and below the bottom 6 of the tank 7. The parts are so interrelated that each can moves in conformity with, and consequently remains for a suitable period of time in alignment with, one of the valves 12 while following its arcuate path below the tank 7.

Each valve 12 is mounted within a circular opening 17 in the tank bottom 6 provided with female threads 18. The housing 19 of the valve 12 is provided with male threads 21 complementary to the threads 18, whereby the valve housing 19 is secured rigidly to the tank 7 in position extending through the bottom 6 thereof. A locking collar 22 is also threaded upon the housing 19 and can be tightened against the under surface of the bottom 6 to lock the housing against displacement from its operating position with respect to the tank 7. A gasket 23 of yieldable material is compressed between the tank bottom 6, the collar 22, and the exterior surface of the valve housing 19 to provide a leak-proof joint between the tank and the valve housing.

An upward cylindrical extension 25 of the valve housing 19 provides support for a measuring cylinder 26 rigidly but removably secured to the extension 25 by a plurality of machine screws 27 (Fig. 2), each of which seats within a bayonet-lock slot 28 in the lower end of the measuring cylinder 26. A sealing ring 29 of resilient material is seated in a circumferential groove 30 in the outer wall of the housing extension 25 and establishes a fluid-tight seal between it and the measuring cylinder.

A bridge 31 is welded to the cylinder 26 in position extending across the open upper end 32 thereof, and supports a valve rod 33, the upper end of which is seated within an axial opening 34 of the bridge 31. Set collars 36 and 37 adjustably fastened to the rod 33 by set screws 38 and 39, respectively, secure the valve rod 33 to the bridge 31 in selected position of vertical adjustment. A valve head 41 of substantially spherical form is secured to the lower end of the valve rod 33 by means of a shank 42 integral with the valve head 41 and securely fitted to a socket 43 in the lower end of the valve rod 33. The parts are so proportioned that the valve head 41 is disposed coaxially within the valve housing 19 at an elevation slightly below that of the upper surface of the tank bottom 6. A circumferential groove 46 encircling the valve head 41 in a horizontal plane, retains a sealing ring 47 of rubber or "Neoprene" and of circular cross-section.

A sleeve 51 is reciprocably mounted in the bore 52 of the tubular valve housing in position for the valve head 41 to lie within the bore 53 of the sleeve. The bore 53 comprises a lower portion 54, the diameter of which is such that the resilient sealing ring 47 establishes an efficient fluid-tight, sliding fit with the wall of the bore portion 54 when the valve head 41 is disposed within that part of the bore. The bore 53 also includes an upper portion 56 of larger diameter than the lower portion 54 and connected thereto by a short tapering portion 57. The reciprocable sleeve 51 is so constructed and so disposed within the stationary tubular housing 19 that when said sleeve is in its uppermost position as illustrated in Fig. 1, the valve head 41 is seated within the lower portion 54 of the sleeve's bore 53, and when the sleeve is in its lowermost position as is illustrated in Fig. 2, the lower, smaller portion 54 of the bore 53 is withdrawn downward from embracing relation with the valve head 41 so that the latter is then disposed within the upper, larger portion 56 of the bore 53. The sleeve 51 is provided with a plurality of sealing rings 58, each seated in a circumferential groove 59 and making fluid-tight sliding engagement with the stationary housing 19.

Two diametrically opposed inlet ports 61, rectangular in form, are provided in the extension 25 of the stationary valve housing 19 substantially in alignment with the upper surface of the bottom 6 of the tank 7 (Fig. 2). Corresponding ports 62 are formed in the reciprocable valve sleeve 51 adjacent the lower end of the large portion 56 of the bore 53 and between two of the sealing rings 58. The ports 62 are in such position that they register with the ports 61 of the stationary valve housing 19 when the sleeve 51 is in its uppermost position (Figs. 1 and 3). But when the sleeve 51 is removed from its uppermost position the ports 62 are withdrawn from registry with the ports 61, and the sleeve 51 thus serves effectually to close the ports 61 (Fig. 2) and thereby isolate that portion 13' of the liquid 13 within the tank 7 which entered the measuring cylinder 26 while the sleeve 51 was raised.

Means are provided for reciprocating the sleeve 51 of each of the several valves 12, in suitably timed relation with the cyclical operation of the can filling machine of which the valve 12 is a part. The reciprocating means includes a pin 66 rigidly secured by threads 67 to the sleeve 51 adjacent the lower end of the latter and extending radially therefrom through a vertical slot 68 extending upward from the lower end of the stationary valve housing 19. An anti-friction roller 69 is journalled upon that portion of the pin 66 which is in alignment with the sides of the slot 68; and since the diameter of the roller 69 is only slightly less than the width of the slot 68, the roller 69 serves the double function of restraining the reciprocable sleeve 51 against rotation within the valve housing 19 and minimizing friction between the pin 66 and the valve housing 19. A second roller 71 is journalled upon the pin 66 adjacent the outer end of the latter and beyond the confines of the valve housing 19. The roller 71 rides within a camway 72 of channel-shaped cross-section (Fig. 2) being disposed between its upper and lower flanges 73 and 74 respectively. The camway 72 is mounted rigidly upon the frame (not shown) of the can filling machine, with respect to which the tank 7 is rotatable; and the camway 72 extends in a continuous circle about the axis of rotation of the tank 7. Hence, as the tank 7 turns the roller 71 travels along the camway 72, remaining between the continuous flanges 73 and 74 thereof. A portion 76 of the camway 72 is at a lower level and another portion 77 is at a higher level, the two portions 76 and 77 being interconnected by inclined portions 78 (only one of which is shown) which preferably merge gradually at their ends into the lower and upper portions 76 and 77, respectively, of the camway 72. Accordingly, as the camming roller 71 travels along the camway 72, it operates to raise and lower the reciprocable valving sleeve 51 as the roller 71 moves from the lower portion 76 to the upper portion 77 and conversely, from the upper portion 77 to the lower portion 76, respectively.

It will be understood that the camway 72 is designed and mounted upon the frame of the can filling machine in such a manner that the described lowering of the valving sleeve 51 occurs after a can to be filled has been disposed below the valve 12, and the lifting of the sleeve 51 occurs after a time interval of sufficient duration to permit the contents 13' of the measuring cylinder 26 to flow into the can and before the can is displaced from below the valve 12.

As a precautionary measure to prevent inadvertent removal of the reciprocable sleeve 51 from the stationary valve housing 19, a stop pin 86 is threaded to and extends through the skirt 87 of the stationary valve housing 19, disposing its inner end 88 below and in the path of the sleeve 51. However, in order to prevent the pin 86 from interfering with the proper motion of the sleeve 51 within the housing 19 during normal operation of the apparatus, a slot 89 is provided in the lower end of the sleeve 51 so that the pin 86 does not actually make contact with the sleeve 51 unless and until the sleeve 51 drops to a lower position within the housing 21 than any position which it is permitted to assume while the camming roller 71 is in proper engagement with the camway 72.

*Operation*

As stated hereinabove, cans to be filled are supplied to the can filling machine and are caused to advance in a circular path with each can immediately below one of the filling valves of the present invention, and the camway 72 is so designed that promptly after arrival of a can under a filling valve, the camming roller 71 of that valve leaves the upper portion 77 of the camway 72 and rides downward along a sloping portion 78 until it enters the lower portion 76 of the camway 72. In so doing the camming roller 71 and pin 66 effect lowering of the reciprocable sleeve 51, thus removing the ports 62 of the sleeve 51 from registry with the ports of the stationary valve body 19. This isolates first the liquid 13' entrapped within the measuring cylinder 26 from the liquid 13 remaining within the tank 7. Continued downward motion of the reciprocable sleeve 51 thereafter effects withdrawal of the smaller portion 54 of the bore 53 of the sleeve 51 from its sealing engagement with the valve head 41 and thereby effects opening of the bore 53. This permits the liquid 13' entrapped within the measuring cylinder 26 to flow by gravity through the bore 53 and into the can (not shown) immediately below the open lower end of the bore 52 of the stationary sleeve 19. The relatively smooth nature of the bore 53 attained by the gradual decrease in size from the larger portion 56 to the smaller portion 54 by means of the tapering portion 57 contributes to the freedom with which the liquid 13' flows from the measuring cylinder 26 to the receptacle being filled with minimum turbulence. Another factor of value in this connection is the spherical shape of the valve head 41, around which the liquid 13' flows rapidly and smoothly.

The extent of the lower portion 76 of the camway 72 is ample to assure that the sleeve 51 remains in its lower, discharge position long enough for all of the contents 13' of the cylinder 26 to be released. Thereafter, but before the filled can leaves its position below the filling valve 12, the camming roller 71 encounters an upwardly inclining portion 78 of the camway 72, causing the sleeve 51 to return to its upper position as illustrated in Fig. 1. This causes the smaller portion 54 of the sleeve's bore 53 to return to sealing engagement with the valve head 41, effectually closing off the bore 53. Thereafter the ports 62 of the sleeve 51 move into registry with the ports 61 of the housing 19, permitting a fresh charge 13' of liquid to enter the measuring chamber 26 from the tank 7. Means not shown herein but fully described in the said application hereinabove identified, are provided for maintaining the supply of liquid 13 in the tank 7 at a constant level, so that the same accurately measured quantity 13' of liquid is entrapped within and is discharged from the cylinder 26 during each cycle of operation of the valve 12.

While the sleeve 51 is in its upper position, the can previously filled is withdrawn from under the valve housing 19 and its place is taken by an empty can. This completes a cycle of operation of the apparatus and shortly thereafter the camming roller 71 again enters the downwardly inclined portion 78 of the camway 72, thus beginning a subsequent cycle.

Thus it may be seen that the measuring and dispensing valve of the present invention is characterized by extreme simplicity, being composed by a minimum number of parts, each of which is of extremely simple design —a factor which contributes materially to the facility of cleansing and sterilizing the parts. The valve 12 includes only one moving part and this controls both the flow of liquid 13 into the measuring cylinder 26 and also the discharge of a measured quantity of liquid 13' from the valve 12 to the can being filled. Ease of dismounting the valve 12 from the tank 7 is another valuable feature since it aids in decreasing the "shut down" time required for cleansing and sterilizing the entire machine. After the camming roller 71 has been disengaged from the camway 72, it is necessary only to loosen the collar 22 to permit removal of the entire valve 12 from the tank 7 by unscrewing the valve downwardly until its threads 21 are disengaged from the bottom 6 of the tank 7. Unscrewing the stop pin 86 far enough to remove its inner end 88 from the bore 52 of the stationary sleeve 19 permits easy withdrawal of the reciprocable sleeve 51 from the body 19. Loosening the set screws 38 permits removal of the set collar 36 whereupon the valve rod 33 and valve head 41 can be removed from within the measuring cylinder 26 thus completing disassembly of the valve 12 for facile cleansing, sterilizing, and inspection of the parts and replacement of any parts found to be in bad order. Reassembling and remounting of the valve is effected in the reverse manner.

While I have shown and described a preferred apparatus, it will be understood that it is capable of variation and modification while still employing the principles of my invention. It is to be understood, therefore, that the scope of the invention should be limited only by the scope and proper interpretation of the claims appended hereto.

Having thus described my invention, what I claim as new and desire to protect by Letters Patent is:

1. Apparatus for measuring and dispensing liquid comprising a measuring receptacle having an inlet port in a wall thereof, a sleeve having a port therein reciprocably mounted in the receptacle so as to close the inlet port thereof when in one position and to open said inlet port when in another position, said sleeve comprising a bore including a lower portion of predetermined diameter and an upper portion of larger diameter, a valve head fitted to the bore of said sleeve for entry bodily thereinto, and means for mounting said valve head in position to seat within the lower portion of said bore to close the bore of said sleeve when the sleeve is in said port opening position and to be received by the upper portion of said bore to open the bore when the sleeve is in said port closing position.

2. Apparatus for measuring and dispensing liquid comprising a measuring receptacle having an inlet port in a wall thereof, a sleeve having a port therein reciprocably mounted in the receptacle so as to close the inlet port thereof when in one position and to open said inlet port when in another position, said sleeve comprising a bore including a lower portion of predetermined diameter and an upper portion of larger diameter, a valve head fitted to the bore of said sleeve for entry bodily thereinto, and means for rigidly supporting said valve head from said receptacle in position to seat within the lower portion of said bore to close the bore of said sleeve when the sleeve is in said port opening position and to be received by the upper portion of said bore to open the bore when the sleeve is in said port closing position.

3. Apparatus for measuring and dispensing liquid comprising a measuring receptacle having an inlet port therein, a sleeve reciprocably mounted in said receptacle, means included in said sleeve for closing said port when the sleeve is in one position, said port closing means being inoperative when the sleeve is removed from said position, the bore of said sleeve including a lower portion of predetermined diameter and an upper portion of larger diameter, a valve head fitted to the lower portion of said bore for fluid sealing sliding engagement therewith in any position of the head within the lower portion of said bore, and means for rigidly supprting said valve head from said valve body in position wherein the valve head is seated in said lower portion of said bore at all times when said sleeve is in its port opening position and wherein the valve head is disposed in the upper portion of said bore when the sleeve is in said port closing position.

4. Apparatus for measuring and dispensing liquid comprising a measuring receptacle having a port in a wall thereof, a sleeve reciprocably mounted in said receptacle and having a port therein for registry with said wall port, said sleeve being adapted to close said wall port when in a lower position, the bore of said sleeve including a lower portion of predetermined diameter and an upper portion of larger diameter, a valve head, and means for fixedly mounting the valve head within said receptacle in position to seat within said lower portion of said bore when said sleeve is in an upper position.

5. Apparatus for measuring and dispensing liquid comprising a tank, a tubular valve body rigid with and extending through the bottom of said tank, means defining a measuring chamber rigid with and extending upward from said valve body within the tank, a sleeve reciprocable within the bore of said body, the bore of said sleeve including a lower portion of predetermined diameter and an upper portion of larger diameter, said valve body and said sleeve having ports registering with each other to establish communication between the tank and the bore of said sleeve when the sleeve is in an upper position, a valve head fitted to the bore of said sleeve, means for mounting said valve head in fixed relation to said valve body and in position to seat in the lower portion of said bore when the sleeve is in said upper position, and means for reciprocating said sleeve to dispose the sleeve alternately in said upper position and a lower position.

6. Apparatus for measuring and dispensing liquid comprising a tank, a tubular valve body rigid with and extending through the bottom of said tank, means defining a measuring chamber rigid with and extending upward from said valve body within the tank, a sleeve reciprocable within the bore of said body, the bore of said sleeve including a lower portion of predetermined diameter and an upper portion of larger diameter, said valve body and said sleeve having ports registering with each other to establish communication between the tank and the bore of said sleeve when the sleeve is in an upper position, a valve head having a circumferential groove, a resilient sealing ring seated in said groove and fitted to the lower portion of the bore of said sleeve, means for mounting said valve head in a fixed position with relation to said valve body adapting the valve head to seat in the lower portion of said bore when the sleeve is in said upper position, and means for reciprocating said sleeve to dispose the sleeve alternately in said upper position and in a lower position with the valve head in said upper portion of the bore of the sleeve.

References Cited in the file of this patent

UNITED STATES PATENTS

| | | |
|---|---|---|
| 886,596 | Gorman | May 5, 1908 |
| 889,106 | Cunningham | May 26, 1908 |
| 1,454,572 | Walters | May 8, 1923 |
| 2,018,552 | Grammer | Oct. 22, 1935 |
| 2,457,531 | Costakos | Dec. 28, 1948 |
| 2,704,650 | Rand | Mar. 22, 1955 |